Nov. 11, 1958  R. T. SHEEHAN  2,859,861
ARTICULATED BELT CONVEYOR
Filed March 21, 1955  2 Sheets-Sheet 1
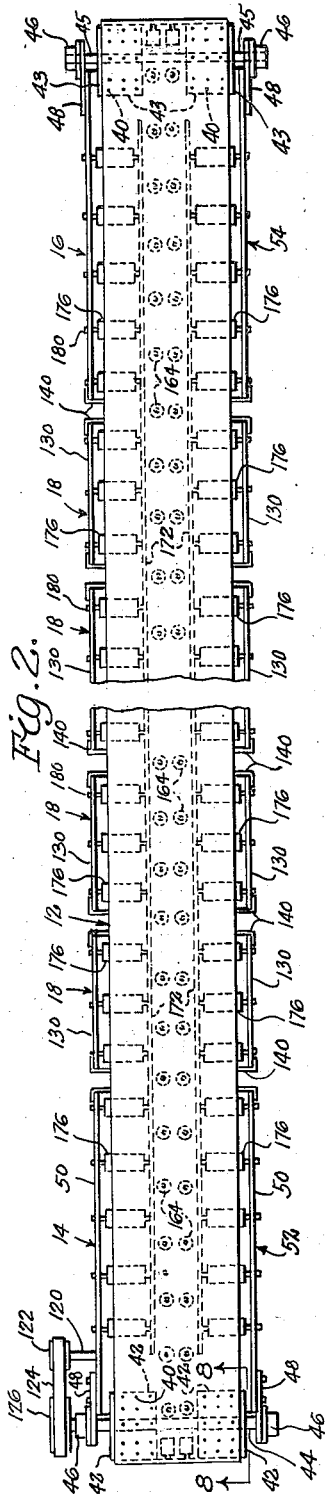
INVENTOR.
Robert Thomas Sheehan
Barthel & Bugbee
Attys Nov. 11, 1958  R. T. SHEEHAN  2,859,861
ARTICULATED BELT CONVEYOR
Filed March 21, 1955  2 Sheets-Sheet 2
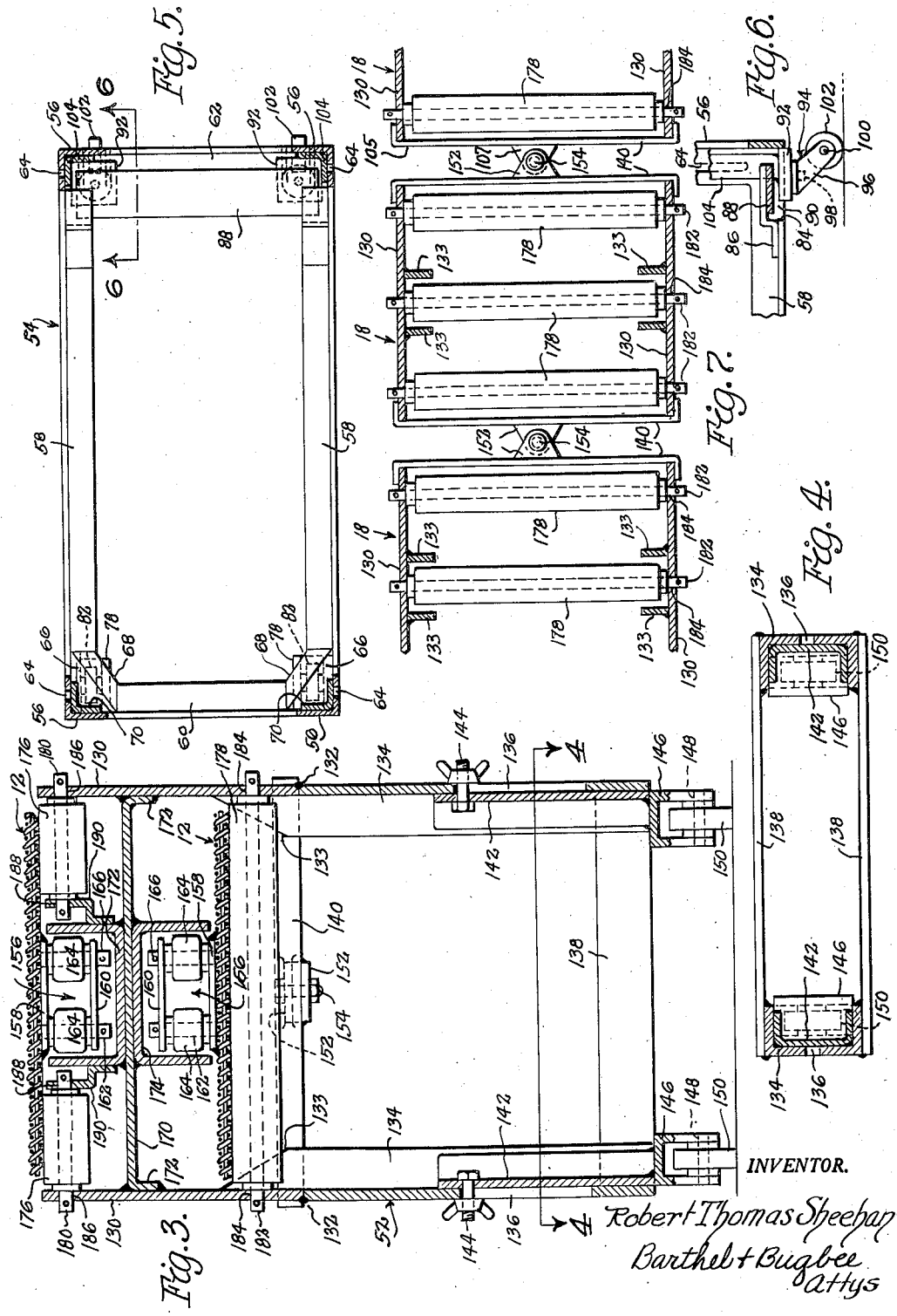
INVENTOR.
Robert Thomas Sheehan
Barthel + Bugbee
attys

United States Patent Office 2,859,861
Patented Nov. 11, 1958

2,859,861

ARTICULATED BELT CONVEYOR

Robert Thomas Sheehan, Livonia, Mich.

Application March 21, 1955, Serial No. 495,650

1 Claim. (Cl. 198—109)

This invention relates to conveyors.

One object of this invention is to provide an articulated flexible belt conveyor which can be arranged or rearranged at will to accommodate itself to different loading, unloading or conveying conditions, or to changing conditions occurring during loading or unloading.

Another object is to provide an articulated flexible belt conveyor which is quickly and easily moved from a straight path into a curved or undulating path according to the existing conditions, the conveying belt being so constructed and arranged as to stretch along one edge while it contracts along the other edge, means being provided for automatically supplying the additional links of belt necessary in passing around a turn.

Another object is to provide an articulated flexible belt conveyor which is constructed in wheeled car units which can be added or subtracted according to the length of path of conveying, the intermediate units being easily inserted or removed in order to adapt the conveyor to longer or shorter paths of conveying.

Another object is to provide an articulated flexible belt conveyor according to the object immediately preceding wherein the conveyor is also provided at its opposite ends with driving and driven terminal car units respectively, between which the intermediate car units are coupled by means of articulated connections.

Another object is to provide an articulated flexible belt conveyor wherein the conveyor belt is guided along substantially its entire length of travel by rollers operating in guideways, this guiding arrangement nevertheless permitting the conveyor to be moved into a curved path or back into a straight path without interfering with the guidance thereof and without relinquishing such guidance.

Another object is to provide an articulated flexible belt conveyor which is provided with adjusting means enabling it to be quickly and easily adapted to resting and operating upon an undulating surface, such as an uneven floor or rolling ground.

Another object is to provide an articulated flexible belt conveyor of the foregoing character having a loosely woven wire belt capable of being bent into a curve in its own plane, yet having meshes of sufficiently large sizes to enable the penetration of driving pins on a driving drum or pulley.

Other objects and advantages of the invention will become apparent during the course of the following description of the accompanying drawings, wherein:

Figure 1 is a side elevation of an articulated flexible belt conveyor according to one form of the invention, with the central portion omitted to conserve space and with the woven mesh construction of the belt omitted to avoid undue complexity of showing;

Figure 2 is a top plan view of the conveyor shown in Figure 1, likewise with the central portion omitted to conserve space;

Figure 3 is an enlarged vertical cross-section taken along the line 3—3 in Figure 1, showing the guiding arrangement for the flexible belt;

Figure 4 is a horizontal section taken along the line 4—4 in Figure 3, showing the adjusting arrangement, also shown in Figure 3, for adapting the conveyor units to fit an undulating surface;

Figure 5 is a horizontal section through the driven terminal unit of Figures 1 and 2, showing the base frame construction;

Figure 6 is a fragmentary vertical section taken along the line 6—6 in Figure 5, showing the caster wheel mounting;

Figure 7 is a horizontal section taken along the line 7—7 in Figure 1, showing further details of the guidance of the lower course of the belt conveyor and the articulation between successive conveyor units;

Figure 8 is a fragmentary vertical section taken along the line 8—8 in Figure 1, showing the manner of driving the woven wire conveyor belt by drive pins on a driving drum; and Figure 9 is a top plan view of a portion of the conveyor belt shown in Figure 8.

Referring to the drawings in detail, Figures 1 and 2 show an articulated flexible belt conveyor installation, generally designated 10, consisting generally of a flexible endless loosely-woven wire mesh belt 12 supported between driving and driven wheeled terminal car units 14 and 16 respectively and by wheeled intermediate car units 18 connected between the terminal car units 14 and 16. The conveying belt 12 consists (Figures 8 and 9) of laterally-elongated links 20 pivotally interconnected by elongated undulating pivot pins or rods 22. The links 20 are constructed of wire woven into the shape of a flattened helical spring with convolutions 24 arranged in a zig-zag path around an elongated central space 26 which is race-track-shaped in cross-section and which has the upper and lower members 28 and 30 arranged in substantially parallel planes, with arcuate or rounded junctions 32 interconnecting them.

The pivot pins or rods 22 are of undulating shape so as to provide indentations or notches 34 alternately directed in opposite directions (Figure 5) for receiving the rounded end portions 32 of the links 20. The pivot pins or links 22 are welded or otherwise secured as at 36 to the outermost convolution 24 of each link 20 so as to rigidly connect one pivot pin 22 to each link 24. Since the adjacent curved portions 32 of the adjoining link 20 loosely and movably engage the pivot rod or pin 22 of the next link 20, the adjacent pivot rods 22 can move out of parallelism with one another into the spaces 26 within the links 20 so as to cause the ends of the pivot rods 22 to closely approach one another on one side of the belt while remaining separated from one another on the opposite side of the belt when the belt is caused to execute a turn in its own plane.

Between the successive convolutions 24 of each link 20, the zigzag arrangement of the upper and lower portions 28 and 30 thereof provides triangular spaces 38 into which pins 40 on driving and driven drums 42 and 43 of the driving and driven units 14 and 16 can enter (Figures 8 and 9). The driving and driven drums 42 and 43 (Figure 2) are in pairs spaced axially apart from one another near the opposite ends of shafts 44 and 45 journaled in bearings 46 secured to brackets 48 which in turn are bolted or otherwise secured to the side plates 50 of the frames 52 and 54 of the driving and driven terminal units 14 and 16 respectively.

The frames 52 and 54 of the driving and driven terminal units 14 and 16 are of generally similar construction, with the frame 52 having certain additional parts, hence a single description with similar reference numerals will suffice for both. The side plates 50 of the frames 52 and 54 are welded or otherwise secured to upright angle members 56, the lower ends of which are welded to longitudinal angle members 58, the angle members 56 being interconnected by inner and outer horizontal end members 60 and 62 welded thereto (Figure 5). The inner horizontal end members 60 are angle members, whereas the outer horizontal end members 62 are in the form of bars (Figures 5 and 6). The upright angle members 56 are provided with elongated slots 64.

The horizontal flanges of the inner horizontal members 60 and of the horizontal angle members 58 adjacent the latter are cut away to provide gaps or spaces 66 (Figure 5) across which extend diagonal braces 68 welded at their opposite ends to the horizontal flanges of the angle members 60 and 58. Slidably mounted within and nesting with the upright angle members 56 are angle legs 70 clamped against the upright angle members 56 by means of wing bolts 74 (Figure 1) passing through the elongated slots 64. Welded or otherwise secured to the lower ends of the angle legs 70 are yoke-shaped brackets 78 carrying axles 80 upon which wheels 82 are rotatably mounted.

At the outer end of each of the frames 52 and 54 (Figures 5 and 6), the horizontal flanges of the horizontal angle members 58 are cut away as at 84 and Z-brackets or plates 86 welded thereto and in turn carrying a horizontal cross plate 88 welded to the under side thereof (Figure 6). In this manner, the cross plate 88 is disposed on a higher level than the horizontal flanges of the angle members 58, so as to provide a working space 90 to accommodate the base 92 of a swivel or caster wheel, generally designated 94, having a yoke-shaped bracket 96 swivelled as at 98 to the base 92 and carrying an axle 100 on which a wheel 102 is rotatably mounted. The base 92 of each of the two caster wheels 94 at the outer end of each of the frames 52 and 54 is welded or otherwise secured to an angle leg 104 which nests within each of the angle members 56 adjacent the caster wheels 94. The angle legs 104 slidably engage the angle members 56 and are adjustably secured thereto by wing bolts 106 extending through the slots 64. By this construction, the angle legs 70 and 104 may be raised or lowered independently of one another to adapt the driving or driven units 14 or 16 to an undulating or uneven floor or ground. Each of the frames 52 and 54 is provided with an upper end cross member 105 welded thereto and carrying a coupling tongue 107 (Figure 7). The belt-guiding mechanism within the driving unit 14, driven unit 16 and intermediate units 18 is of generally similar construction within these units and is described subsequently below.

In addition to the structure described above, common to both the driving and driven terminal units 14 and 16, the driving terminal unit 14 is additionally provided with a shelf or floor plate 108 supported by angle brackets (not shown) from the ends of the frame 52 independently of and permitting free adjustment motion of the legs 104. Bolted or otherwise secured to the shelf 108 is a motor 110 having an armature shaft 112 connected by gearing or sprocket mechanism 114 to the input shaft 116 of a reduction gear-box 118 also bolted or otherwise secured to the shelf 108. The reduction gearbox 118 has an output shaft 120 (Figure 1) carrying a drive pulley 122. The latter is drivingly connected by a belt 124 to a pulley 126 mounted on the outer end of the shaft 44 (Figure 2). In this manner, the motor 110 drives the driving drums 42 which in turn drive the conveyor belt 12, as explained below in connection with the operation of the invention. Secured to the side plates 50 and descending at an inclined angle to the shelf 108 are angle guide and belt storage tracks 128, the lower ends of which are secured as by welding to the shelf 108.

The intermediate units 18 are of constructions somewhat resembling the terminal units 14 and 16 as regards their adjustment to uneven or undulating floors. Each intermediate unit 18 (Figures 1 to 4 inclusive and 7) consists of side plates 130 welded or otherwise secured as at 132 to the cutaway upper end portions 133 of upright channel members 134, the lower portions of which are provided with elongated slots 136. The uprights 134 are interconnected on their opposite sides by lower and upper cross members 138 and 140 respectively, welded to the adjacent portions of the upright channel members 134. Slidably mounted within the upright channel members 134 are channel legs 142 (Figures 3 and 4) nesting therewith and slidable relatively thereto. The channel legs 142 are drilled to receive wing bolts 144 extending through the slots 136 and serving to clamp the angle legs 142 tightly and immovably against the angle uprights 134 (Figure 3). Welded to the lower ends of the channel legs 142 are yoke-shaped brackets 146 drilled to receive axles 148 on which wheels 150 are rotatably mounted. By this means, the channel legs 142 and their respective wheels 150 are adjustably mounted to accommodate them to uneven or undulating floors. Each of the intermediate units 18 is provided with a coupling tongue 152 secured as by welding to its respective cross member 140 (Figures 3 and 7) the coupling tongues 152 on opposite ends being on slightly different vertical levels so as to fit the adjacent coupling tongue of the adjoining intermediate unit 18 or terminal unit 14 or 16, as the case may be. The coupling tongues 152 and 107 are drilled to receive coupling pins or bolts 154.

The belt guiding and supporting mechanism within each of the intermediate units 18 is generally similar to that within the terminal units 14 and 16, hence a single description and corresponding reference numerals will suffice for all three sets of units 14, 16 and 18 respectively. The woven flexible conveyor belt 12 is provided with vertically-disposed roller guide units, generally designated 156, disposed at intervals along the inner side of the belt 12 in the central path thereof so as to pass through the space between the driving drums 42 and driven drums 43. Each of the roller guide units 156 (Figure 3) consists of parallel bars 158 and 160 drilled to receive a pair of parallel roller axles 162 upon which rollers 164 are rotatably mounted. The rollers 164 are preferably provided with anti-friction bearings (not shown) and the axles 162 are preferably welded at their outer ends to the bars 158 and pinned or otherwise secured as at 166 to the bars 160. The bars 158 of the roller guide units 156 are welded to the inner side of the belt 12 at intervals around the entire extent thereof, as shown in Figures 1 and 2.

In order to provide fixed guidance for the roller guide units 156 of the belt 12, each of the intermediate units 18 and also the terminal units 14 and 16 is provided with a shelf 170, the flanged opposite edges 172 of which are welded or otherwise secured to the side plates 130 or 50, whichever the case may be. Welded to the central portions of the upper and lower sides of each shelf 170 are upper and lower channel guide tracks 172 and 174 respectively of sufficient widths and depths to loosely but guidingly receive the successive belt roller guide units 156 as the conveyor belt 12 moves along its endless path (Figure 3). By this means, the belt 12 is prevented from shifting laterally, even when traversing a turn or curve in its own plane.

To support the upper and lower courses of the belt 12, upper and lower rollers 176 and 178 are provided, mounted on upper and lower axles 180 and 182 respectively. The upper rollers 176 are in axially-aligned laterally-spaced pairs disposed in the spaces between the upper channel tracks 172 and the side plates 130 or 50, as the case may be, whereas the lower rollers 178 are long enough to extend entirely across the interior of the unit 14, 16 or 18, so that only single rollers 178 and single axles 182 are required. The side plates 130 or 50 are suitably drilled as at 184 to receive the opposite ends of the long lower axles 182 and at 186 to receive the outer ends of the short upper axles 180 (Figure 3). The inner ends of the short upper axles 180 are supported in holes 188 in vertical Z-brackets 190, the offset lower ends of which are welded to the outsides of the flanges of the upper guide tracks 172. The rollers 176 and 178 are also preferably rotatably supported on anti-friction bearings, plain bearings being shown in the drawings for purposes of simplicity. In the driving terminal unit 14, the horizontal lower rollers 178 above the inclined guide tracks 128 are omitted to provide a gap or space 192 into which any slack portion of the belt 12 may hang (Figure 1).

In the operation of the invention, let it be assumed that the conveyor installation 10 has been pulled or otherwise moved to the location on the floor F where it is to be used, and for example, that articles are to be transported upon it between two places located 90° apart and consequently requiring a 90° change of direction in the belt 12. To accomplish the change of direction, the operator grasps one of the terminal units 14 or 16 and pulls it around into a position at an angle of 90° to its original position, preferably by also pulling it forward at the same time so as to move the intermediate units 18 into intermediate positions in the manner of a train of railway cars rounding a curve. The articulation of the units 14, 16 and 18 at their pivot pins 154 and tongues 107, 152 permits this to be done easily and rapidly. While the conveyor 10 is moving into this arcuate position, the caster wheels 94 facilitate swinging of the terminal units 14 and 16 and the remaining wheels 80 and 150 facilitate the travel of the conveyor installation 10 into its new position.

While the upper and lower courses of the conveyor belt 12 are moving into 90° turns in their own planes in this manner, the inner ends of the belt pivot rods 22 move closer to one another out of parallelism while the outer ends remain at their maximum spacing. Thus, the pivot rods 22 move from their parallel positions (Figure 9) to converging positions at the turn in the conveyor belt 12. If the floor F is not level, the operator adjusts the various legs upward or downward by loosening the wing bolts 74, 106 and 144, as necessary, retightening these wing bolts when the legs have reached their new positions wherein their respective wheels 102, 82, 80 and 150 rest firmly on the ground or floor F.

When the operator starts the electric motor 110, the consequent rotation of the pulleys 122 and 126 by the belt 124 causes the shaft 44 and driving drums 42 to rotate, whereupon the pins 40 enter the spaces 38 between the convolutions 24 (Figures 8 and 9), causing the belt 12 to travel in an endless path. As the belt 12 is thus moved, the motion is transmitted to the idler or driven drums 43 on the driven terminal unit 16, while at the same time the end of the belt 12 located at that position is rotatably supported. As the belt 12 travels in its endless path, the upper and lower courses thereof are supported by the upper and lower rollers 176 and 178 respectively, the rollers 176 also supporting the weight of the parts conveyed by the upper course of the belt 12. While the upper and lower courses of the belt 12 are travelling in this manner, they are prevented from moving laterally by the engagement of the vertical rollers 164 with the flanges of the upper and lower channel tracks 172 and 174 respectively.

In order to provide an adequate amount of slackness in the belt 12 to enable it to assume an arcuate or otherwise curved position, the belt 12 is made of excessive length, the excess being accommodated by the inclined angle guide track 128 (Figure 1) in the gap 192 between the horizontal lower rollers 178 of the driving terminal unit 14.

The present conveyor is especially well adapted to the loading or unloading of railway freight cars or highway trucks, because of the fact that the conveyor can be quickly rearranged as loading of the car or truck proceeds, backing the conveyor outward through the car or truck door as the car or truck becomes more nearly loaded to its full capacity.

The term "laterally-yieldable" as used in the claim herein means that different portions of the conveyor belt located in a common plane are yieldable relatively to one another in that common plane.

What I claim is:

An articulated laterally-yieldable belt conveyor comprising a wheeled driving terminal car unit having a frame, a conveyor driving wheel rotatably mounted in said frame, and a prime mover drivingly connected to said driving wheel; a wheeled driven terminal car unit spaced apart from said driving terminal car unit and having a frame and a conveyor driven wheel rotatably mounted thereon; and a plurality of wheeled intermediate car units disposed between said driving and driven car units in flexibly-coupled relationship therewith and with each other, each intermediate car unit having a frame and a conveyor supporting wheel rotatably mounted thereon; and a laterally-yieldable endless wire mesh belt trained over each supporting wheel and around said driving and driven wheels in driving engagement with said driving wheel, said conveyor belt being composed of elongated multiple-looped links disposed substantially parallel to one another with the loops of adjacent links loosely and pivotally connected to one another for relative shifting out of parallelism with one another while remaining in a substantially common plane in response to their traversing a lateral bend in the path of the conveyor belt, said car units having laterally-spaced parallel guide tracks mounted therein in alignment with one another, elongated guide roller axle supports secured to the inner sides of certain of said links in longitudinally-spaced parallel relationship transversely of said belt along the entire length thereof, guide roller axles secured in pairs to said axle supports and extending perpendicularly thereto into the space between said guide tracks, and pairs of conveyor belt guide rollers rotatably mounted on said axles and guidedly engageable with said guide tracks, the spacing of said guide roller axle supports along said belt being such that at any instant at least one pair of said guide rollers is guidedly engageable with the guide tracks on each car unit, said car units being movable laterally relatively to one another so that their median lines will approximate an arc.

References Cited in the file of this patent

UNITED STATES PATENTS

| 747,090 | Schmidt et al. | Dec. 15, 1903 |
| 1,548,278 | Phillips et al. | Aug. 4, 1925 |
| 1,692,832 | Harrison | Nov. 27, 1928 |
| 2,250,933 | Manierre | July 29, 1941 |
| 2,278,361 | Rapisarda | Mar. 31, 1942 |
| 2,377,155 | Jones | May 29, 1945 |
| 2,446,890 | Stadelman | Aug. 10, 1948 |
| 2,494,302 | Mason | Jan. 10, 1950 |
| 2,757,786 | Grebe | Aug. 7, 1956 |

FOREIGN PATENTS

| 611,784 | Great Britain | Nov. 3, 1948 |

OTHER REFERENCES

Publication, R. T. Sheehan Co., Plymouth, Mich., May 22, 1953.